UNITED STATES PATENT OFFICE.

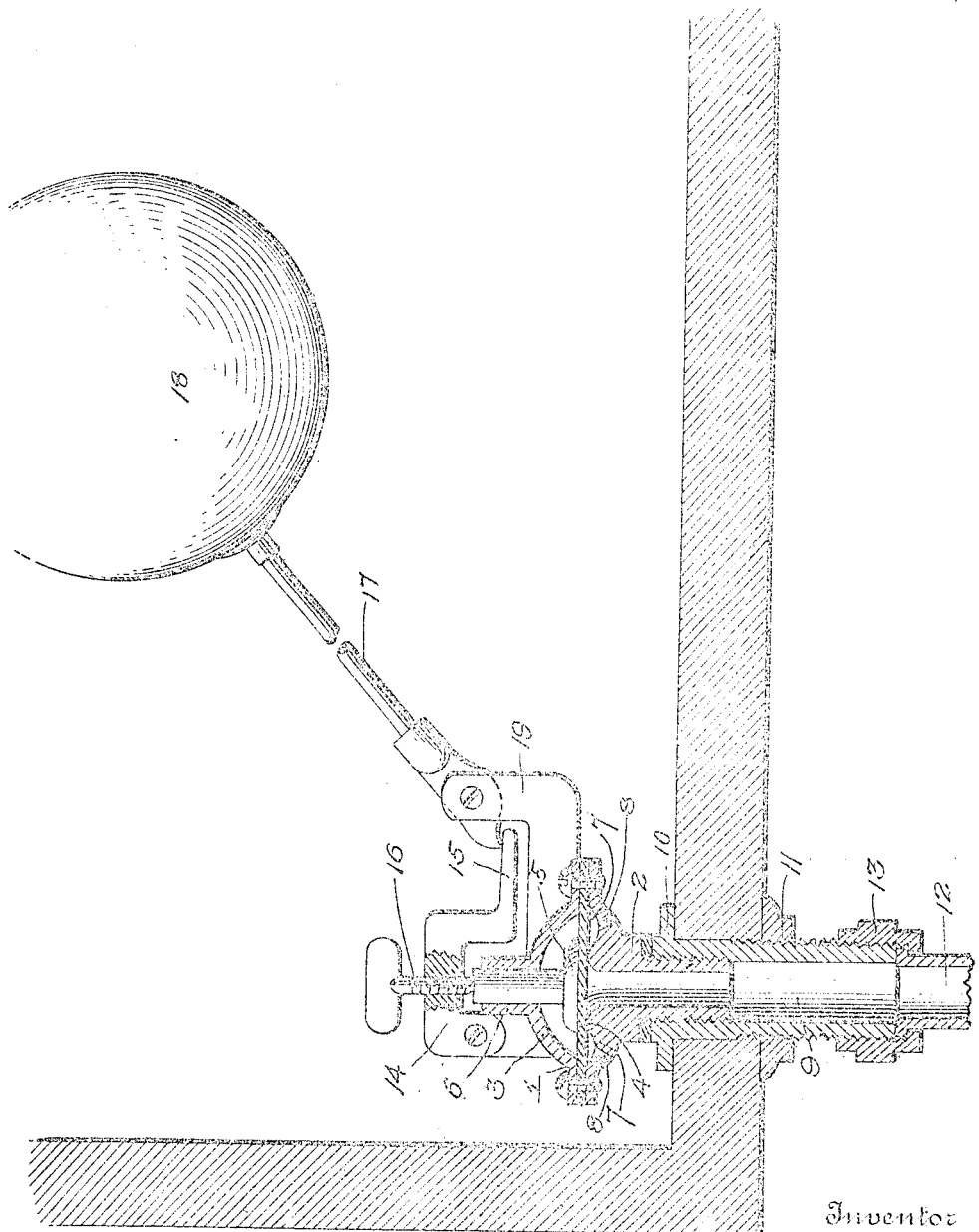

BERTRAM DALE, OF MILWAUKEE, WISCONSIN.

FLUSHING-TANK VALVE.

No. 926,730.   Specification of Letters Patent.   Patented July 6, 1909.

Application filed June 11, 1908. Serial No. 437,969.

*To all whom it may concern:*

Be it known that I, BERTRAM DALE, a citizen of the United States, residing at Milwaukee, in the county of Milwaukee and State of Wisconsin, have invented certain new and useful Improvements in Flushing-Tank Valves; and I do declare the following to be a full, clear, and exact description of the invention, such as will enable others skilled in the art to which it appertains to make and use the same.

My invention relates to improvements in valves for water closet flushing tanks.

It has for its object to provide for the practically noiseless inlet of water to the tank, and to carry out said purpose in an effective and reliable manner as well as to effect the automatic stoppage of the flow of the water into the tank.

With these and other objects in view, the invention consists of certain novel features of construction, combination and arrangement of parts as will be described and particularly pointed out in the appended claims.

In the accompanying drawing, illustrating the preferred embodiment of my invention, the figure represents a vertical sectional elevation thereof, partly in side view.

In carrying out my invention I suitably provide the flushing tank with a valve, 1, comprising a tubular threaded shank member 2 forming the lower portion of the valve casing, a dome-like member 3 forming the upper part of the casing, an elastic or resilient diaphragm, 4, and the valve member proper, 5, all assembled, preferably as disclosed, said diaphragm being interposed between the members, 2 and 3 of the casing, and suitably bolted thereto. The valve member proper, 5, which has a disk-like lower portion resting upon the diaphragm, 4, has its stem portion extending upwardly through a tubular extension, 6, of the member, 3. The diaphragm, 4, has its lower surface arranged directly above and inwardly spaced off from a broad, annular portion having a corresponding depressed or concaved extension, 7, provided with numerous ports, 8, for the passage of the water from the shank member 2 of the casing, into the flushing tank.

The shank member of the casing, 2, has screw threaded connection with a sleeve or additional tubular member, 9, extending through the bottom of the flushing tank, said member 9 having its upper end provided with a flange, 10, resting upon the upper surface of said tank bottom, said member 9 also having an external screw threaded portion equipped with a lock nut, 11, for securing said member 9 in effective position. Said member 9 has also coupled to its lower receiving end what may be termed a "tail piece," 12, as usually employed in this connection, the coupling between said member 9 and the latter being effected by means of a collar or nut, 13.

A lever, 14, preferably of inverted U-shape, has one end thereof pivoted to an upstanding portion 3' of the member 3, while extending horizontally from the opposite end of said lever 14 is a terminal, 15. Said lever, 14, is provided with an adjusting or regulating screw, 16, adapted to engage the upper end of the valve stem for controlling or predetermining the shutting-off point for the inflow of water, as will be readily appreciated.

A lever, 17, having one end provided with a spherical enlargement or ball, 18, and adapted to rise with the inflow of water, is pivoted to a bracket or arm, 19, of the member, 3, and has its inner end adapted to engage terminal 15 of the lever. 14, as in effecting the closing operation of the valve.

It will be noted that the valve seat, 7, being of broad area and devoid of any angular edges or portions, the action of the valve in effecting contact between the diaphragm, 4, and said seat, will be practically noiseless, as is greatly desirable in this class of devices, as will be readily understood.

In operation it will be seen that in filling the tank with water, as the latter is received into said tank through the pipe, 9, and inlet portion of the valve seat, the water will flow through the ports, 8, and enter said tank, and as the water continues to rise therein, the float, 18, of the lever, 17, will accordingly rise therewith, inclining the inner end of said lever downwardly toward and into engagement with the terminal, 15, of the lever, 14. This action will cause the lever, 14, whose set or thumb screw, 16, is in engagement with the stem of the valve, 5, to descend and accordingly depress said valve upon the diaphragm, 4, which will cause the latter, finally, according to the height of the water in the tank, to engage the valve seat and shut off the inflow of further water, as required.

It will be seen from the foregoing arrangement of parts that a very simple and effective device is provided for the aforesaid purpose, and one which, as stated, is practically noiseless, exceedingly simple and inexpensive, and readily applied for use.

From the foregoing description, taken in connection with the accompanying drawing, the construction and operation of the invention will be readily understood without requiring an extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. A device of the character described comprising a valve and stem for the same, a casing consisting of a shank member provided with a valve seat and a dome-like member carrying the valve, an elastic diaphragm for engagement with said seat, a lever of approximately U-shaped outline equipped with means for engagement with the valve stem and a float equipped lever adapted to engage the aforesaid lever.

2. A device of the character described, comprising a tank or inclosure, a casing consisting of a shank member provided with a valve seat and a dome-like member, a valve arranged in the valve casing, a stem for the valve, an elastic diaphragm interposed between said valve and the seat portion of said casing, a lever overhanging said valve and valve casing and provided with a regulating or controlling screw, and a float equipped lever having one end adapted to engage a terminal of the aforesaid lever.

In testimony whereof I have hereunto set my hand in presence of two subscribing witnesses.

BERTRAM DALE.

Witnesses:
 CHAS. FRIEDRICH,
 OTTO G. HACKBARTH.